(12) United States Patent
Toebes (10) Patent No.: US 10,187,916 B2
(45) Date of Patent: *Jan. 22, 2019

(54) WIRELESS ADAPTER

(71) Applicant: United States Foundation for Inspiration and Recognition of Science and Technology, Manchester, NH (US)

(72) Inventor: John Albert Toebes, Cary, NC (US)

(73) Assignee: United States Foundation for Inspiration and Recognition of Science and Technology, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,307

(22) Filed: Mar. 13, 2017

(65) Prior Publication Data

US 2018/0063875 A1 Mar. 1, 2018

Related U.S. Application Data

(63) Continuation-in-part of application No. 14/684,874, filed on Apr. 13, 2015, which is a continuation of application No. 12/945,139, filed on Nov. 12, 2010, now Pat. No. 9,008,723.

(60) Provisional application No. 61/293,444, filed on Jan. 8, 2010.

(51) Int. Cl.
*H04W 76/10* (2018.01)
*H04W 88/06* (2009.01)
*H04W 88/04* (2009.01)
*H04W 48/18* (2009.01)

(52) U.S. Cl.
CPC ............ *H04W 76/10* (2018.02); *H04W 48/18* (2013.01); *H04W 88/04* (2013.01); *H04W 88/06* (2013.01)

(58) Field of Classification Search
USPC ... 455/41.1, 41.2, 41.3, 550.1, 556.1, 556.2, 455/557, 558, 140
See application file for complete search history.

(56) References Cited

U.S. PATENT DOCUMENTS

| | | | | |
|---|---|---|---|---|
| 7,089,035 B2 * | 8/2006 | Ando | ................ | G07C 9/00182 455/41.2 |
| 7,127,541 B2 * | 10/2006 | Govindarajulu | ........ | H04W 4/18 710/300 |
| D570,844 S * | 6/2008 | Liu | ............................. | D14/433 |
| 7,426,401 B2 * | 9/2008 | Nago | .................... | H04W 60/00 455/418 |
| 7,471,651 B2 * | 12/2008 | Mahany | .................. | G06F 1/163 235/462.46 |
| D599,800 S * | 9/2009 | Klein | .......................... | D14/433 |
| 7,707,348 B2 * | 4/2010 | Huotari | ................... | H04L 67/34 710/305 |

(Continued)

*Primary Examiner* — Fayyaz Alam
(74) *Attorney, Agent, or Firm* — Michelle Saquet Temple (57) ABSTRACT

The present embodiments relates to wireless adaptors. In one embodiment, a method is provided. The method may include obtaining an adaptor-device identification that identifies both a wireless adaptor and a wired device coupled with the wireless adaptor; and communicating with a network device via a wireless network using the adaptor-device identification, the wired device being distinguishable from other wired devices using the adaptor-device identification.

19 Claims, 10 Drawing Sheets

(56) References Cited

U.S. PATENT DOCUMENTS

| | | | | |
|---|---|---|---|---|
| 7,912,502 | B2* | 3/2011 | Ando | G07C 9/00182 |
| | | | | 455/41.2 |
| 2005/0090252 | A1* | 4/2005 | Ando | G07C 9/00182 |
| | | | | 455/435.1 |
| 2006/0116166 | A1* | 6/2006 | Hibino | H04W 28/18 |
| | | | | 455/557 |
| 2007/0016714 | A1* | 1/2007 | Huotari | G06F 13/385 |
| | | | | 710/313 |
| 2011/0021140 | A1* | 1/2011 | Binier | H04B 5/0043 |
| | | | | 455/41.1 |
| 2011/0205965 | A1* | 8/2011 | Sprigg | G06F 9/4411 |
| | | | | 370/328 |
| 2012/0028583 | A1* | 2/2012 | Dorogusker | H01R 31/005 |
| | | | | 455/41.3 |

* cited by examiner

```
//
// REQUEST: GET DEVICE INFO:
//
typedef struct {
    BYTE cmdType;      // Byte 0: 0x01
    BYTE cmdCode;      // Byte 1: 0x9B
} NXTGetDeviceInfoCommand;

// RESPONSE: DEVICE INFO typedef struct {
    BYTE cmdType;      // Byte 0: 0x02
    BYTE cmdCode;      // Byte 1: 0x9B
    BYTE cmdStatus;    // Byte 2: Status, 0 equals success. Greater than 0 means an
error where the value indicates the error message.
    BYTE name[15];     // Byte 3: 17:NXT name (14 characters + null terminator)
    BYTE btAddress[7]; // Byte 18-24: BT address
    BYTE btSignal[4];  // Byte 25: LSB, Bluetooth signal strength
                       // Byte 26:
                       // Byte 27:
                       // Byte 28: MSB, Bluetooth signal strength
    BYTE Flash[4];     // Byte 29: LSB, Free user FLASH
                       // Byte 30:
                       // Byte 31:
                       // Byte 32: MSB, Free user FLASH
} NXTGetDeviceInfoResponse;
```

WIRELESS ADAPTER

CROSS REFERENCE

This application is a continuation of U.S. application Ser. No. 14/684,874 filed Apr. 13, 2015, and entitled Wireless Adapter, now U.S. Publication No. 2016-0014821-A1, published Jan. 14, 2016, which is a continuation of U.S. application Ser. No. 12/945,139 filed Nov. 12, 2010, and entitled Wireless Adapter, now U.S. Pat. No. 9,008,723, issued Apr. 14, 2015, which claims the benefit under 35 U.S.C. § 119(e) of U.S. provisional application No. 61/293,444 filed Jan. 8, 2010, each of which is incorporated by reference in its entirety.

FIELD

The present embodiments relate generally to wireless adaptors.

BACKGROUND

Communication devices may be configured for wireless communication, for example, using an embedded wireless system, such as a radio. However, some communication devices are not configured for wireless communication for various reasons including, but not limited to, cost and size.

DESCRIPTION

Overview

The present embodiments relate generally to wireless communication. In one embodiment, a network includes a network device, a wired device, and a wireless adaptor. The wireless adaptor is communicatively coupled with the network device via a wireless network and the wired device via a wired connection. The wireless adaptor is operable to relay or route communication from/to the wired device. The communication may be transmitted and/or received via the wireless network. The wireless adaptor may be configured or operable to distinguish communication for the wired device from communication for other wired devices using an adaptor-device identification that uniquely identifies the wireless adaptor. As a result, the wireless adaptor may dynamically adopt personalities of the wired devices coupled to the wireless adaptor.

Present Embodiments

The present embodiments relate generally to wireless adaptors. In one embodiment, a wireless adaptor is provided. Wireless adaptors may be configured to connect to and communicate with a wired device and communicate with a network device via a wireless network. Wireless adaptors allow the wired device to communicate wirelessly. Wireless adaptors may include one or more wired connectors, a wireless communication system, a processor, and a memory. The wired connector may be communicatively coupled with the wired device. The wireless communication system may be configured to communicate using a wireless network. In one embodiment, the wireless communication system may be a wireless local area network (WLAN) product that is based on the Institute of Electrical and Electronics Engineers' (IEEE) 802.11 standards. Accordingly, the wireless adaptor allows the wired device to connect to and communicate via wireless networks, such as the wireless local area network.

In one embodiment, the wireless adaptor is operable to change personalities based on the wired device using the wireless adaptor to communicate wirelessly. Changing personalities may include changing, publishing, and/or broadcasting one or more unique identifiers or name prior to, with, or after communication associated with the wired device. In other words, the wireless adaptor is operable to transmit communication that is unique or specific to the wired device. Accordingly, the wireless adaptor may be configured or operable to distinguish communication for the wired device from communication for other wired devices using an adaptor-device identification that uniquely identifies the wireless adaptor. As a result, the wireless adaptor may dynamically adopt personalities of the wired devices coupled to the wireless adaptor.

In one aspect, a method includes obtaining an adaptor-device identification that identifies both a wireless adaptor and a wired device coupled with the wireless adaptor; and communicating with a network device via a wireless network using the adaptor-device identification, the adaptor-device identification uniquely identifying the wired device. The adaptor-device identification distinguishing the wired device from other wired devices configured to be connected to the wireless adaptor.

In a second aspect, a non-transitory computer readable storage medium is encoded with instructions is provided. The instructions are capable of being executed by a computer to: obtain an adaptor-device identification that identifies both a wireless adaptor and a wired device coupled with the wireless adaptor; and communicate with a network device via a wireless network using the adaptor-device identification, the wired device being distinguishable from other wired devices using the adaptor-device identification.

In a third aspect, an apparatus includes a memory, a wireless communication interface, and a plurality of wired connectors. The memory stores adaptor identification information uniquely identifying the apparatus. The wireless communication interface is configured to communicate wirelessly with a network device using the adapter identification information. The plurality of wired connectors are configured to communicate with a plurality of wired devices and receive a plurality of wired device identification values from the plurality of wired devices, wherein the apparatus is configured to communicate differently for each of the wired devices according to the plurality of wired device identification values.

Figure 1:
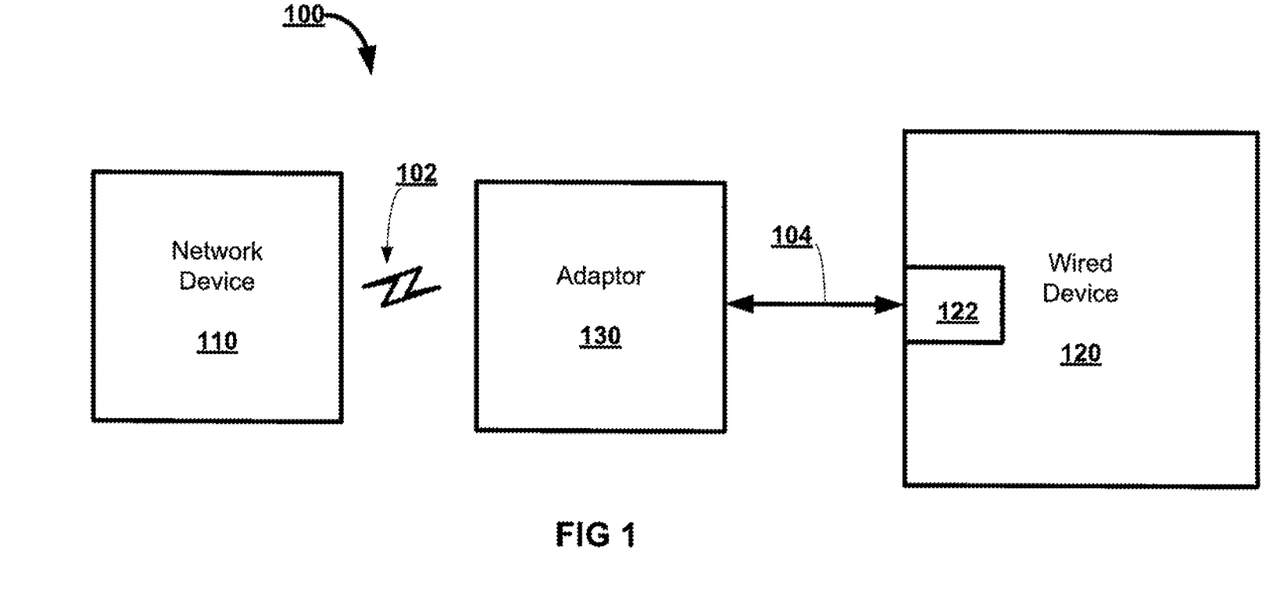
FIG. 1 illustrates one embodiment of a wireless network including a network device, wired device, and a wireless adaptor.

FIG. 1 illustrates one embodiment of a wireless network 100. The wireless network 100 may include a network device 110, a wired device 120, and a wireless adaptor 130. The network device 110 may be communicatively coupled with the wireless adaptor 130 via the wireless network 102. The wired device 120 may be communicatively coupled with the wireless adaptor 130 via the wired connection 104. Coupled with may include directly connected to or indirectly connected through one or more intermediary components. Intermediary components may include hardware, software, networks, or a combination thereof. The wireless network 100 may include additional, different, or fewer components.

The network device 110 may be a router, gateway, personal computer, mobile device, universal serial bus ("USB") device, Firewire® device, cellular phone, personal digital assistant, or other device operable to communicate via wireless network 102. The network device 110 may be operable to transmit and/or receive communication via the wireless network 102. Communication may include messages, signals, or packets carrying information or data. In an alternative embodiment, the communication may not carry information or data.

The wireless network 102 may be any type of network that is wireless, such as a wireless local area network, wireless wide area network, wireless personal area network, wireless metropolitan area network, mobile device network, cellular network, WiFi, or other now known or later developed networks. The wireless network 102 may be a telecommunications network whose interconnections between nodes, such as the network device 110 and wireless adaptor 130, are implemented without the use of wires or cables. The wireless network 102 may use a remote information transmission system that uses electromagnetic waves, such as radio waves, as the carrier. The wireless transmission may occur at the physical level or "layer" of the network 102.

In one embodiment, the wireless network 102 is a Wi-FI® network. Accordingly, the wireless network 102 may be a wireless local area network (WLAN) that is configured based on the Institute of Electrical and Electronics Engineers' (IEEE) 802.11 standards including, but not limited to, 802.11b, 802.11a, or dual-band. The wireless network 102 may use radio waves that provide wireless high-speed Internet and network connections. The wireless network 102 may connect the network device 110 and wireless adaptor 130 via a wireless distribution method, such as spread-spectrum or OFDM radio. The wireless network 102 may operate with no physical wired connection between the network device 110 and the wireless adaptor 130 by using, for example, the radio frequency (RF), a frequency within the electromagnetic spectrum associated with radio wave propagation. In other words, the wireless network 102 may use any radio frequency band (e.g., 2.5 GHz for 802.11b, 802.11g, or 802.11n, and 5 GHz for 802.11a). In contrast to technology that is limited a short range (e.g., 2 feet), the wireless network 102, for example, when configured as a Wi-Fi® network, allows the network device 110 and the wireless adaptor 130 to be located at increased distances from each other (e.g., 3 feet, 20 feet, 50 feet, 500+ feet). Other frequencies, communications standards, and ranges may be used.

The wired device 120 may be a USB device (e.g., a device having a USB port or interface), Firewire® device (e.g., a device having a IEEE 1394 interface), serial advanced technology attachment (SATA) device (e.g., a device having a SATA port or interface), controller area network (CAN) device, Inter-Integrated Circuit (I2C) device (e.g., a device having two bidirectional open-drain lines), or other device having a wired port and/or interface connection. Accordingly, the wired device 120 may be a mobile device, personal computer, USB flash drive, robot (e.g., Lego Mindstorms NXT), gaming system (e.g., X-box®), gaming controller, external hard drive, personal digital assistant, music player, memory device, laptop, router, gateway, network device, printer, scanner, digital camera, MP3 player, hard disk, or other device.

The wired device 120 may be operable to transmit and/or receive communication via the wired connection 104. The wired connection 104 may include a port, connector, cable, wire, circuit, bus, contact, other device or system for transferring communication, or a combination thereof. In one embodiment, the wired connection 104 may be a connection between a USB connector and a USB port. The wired connection 104 may use a wire or cable. Alternatively, the wired connection 104 is between mating connectors without a wire or cable.

In one embodiment, the wired device 120 may be operable to wirelessly communicate, for example, via the wireless network 102. Accordingly, the wired device 120 may include a wireless communication system operable to transmit and/or received wireless communication. The wireless communication system may be embedded in the wired device 120, for example, as a wireless USB circuit. Wireless USB is a short-range, high-bandwidth wireless radio communication protocol created by the Wireless USB Promoter Group. Wireless USB is based on the WiMedia Alliance's Ultra-WideBand (UWB) common radio platform, which is capable of sending 480 Mbis/s at distances up to 3 meters and 110 Mbit/s at up to 10 meters. Wireless USB operates in the 3.1 to 10.6 GHz frequency range. Due to the short range of Wireless USB, the wired device 120 may need the ability to communicate with network devices outside the range of the wireless USB.

In another embodiment, the wired device 120 is not operable, without the wireless adaptor 130, to communicate via any wireless network 102. In other words, the wired device 120 does not include a native, embedded, and/or local wireless communication system. The wired device 120 may not include a wireless communication system for various reasons including, but not limited to, cost and size. For example, in order to maintain a low manufacturing cost or reduced size, the wired device 120 (e.g., a digital camera) may not be manufactured or sold with a wireless communication system. Without a wireless communication system, the wired device 120 is unable to connect to the network device 110 via the wireless network 102. In other words, the wired device 120 is unable to communicate with the network device 110 without a physical connection or unable to communicate at all.

The wired device 120 may be an enumerated wired device. An enumerated wired device may be distinguishable from other similar types or styles of wired devices. For example, the wired device 120 may be a first digital camera. The first digital camera may be distinguishable, for example, having a unique serial number, address, or unique identifier, from other similar styles of digital cameras or other types of devices.

As discussed in more detail below, the wired device 120 may include a wired connector 122. The wired connector 122 may be part of the wired connection 104 that communicatively couples the wired device 120 and the wireless adaptor 130.

Figure 2:
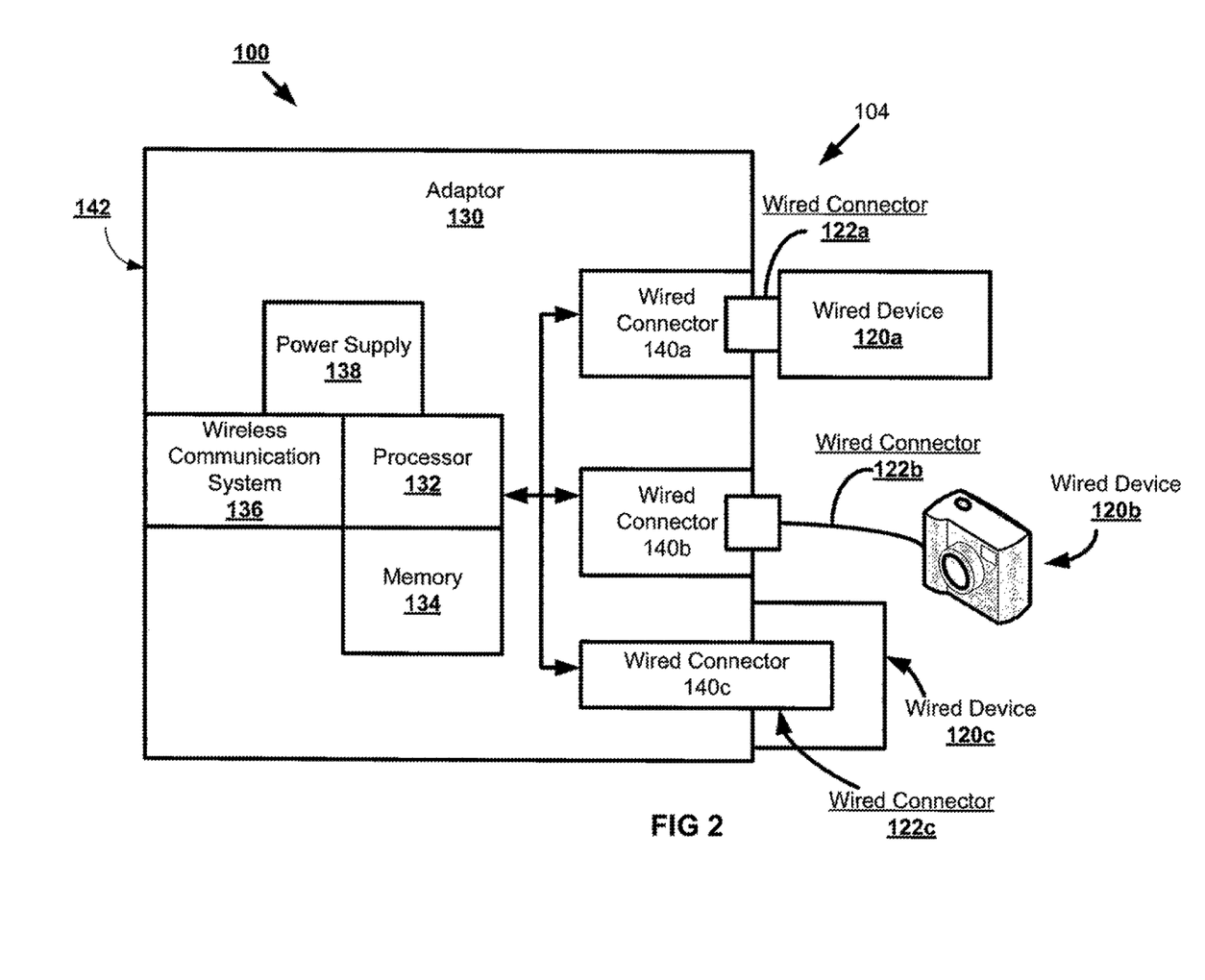
FIG. 2 illustrates one embodiment of a wireless adaptor.

FIG. 2 illustrates one embodiment of the wireless adaptor 130. The wireless adaptor 130 may include a processor 132, a memory 134, a wireless communication system 136, a power supply 138, and one or more wired connectors 140. The wireless adaptor 130 may include additional, different, or fewer components. For example, in one embodiment, the wireless adaptor 130 may include a housing 142. The housing 142 may surround, protect, and/or enclose all, some, or none of the components in the wireless adaptor 130. The housing 142 may include any suitable size, shape, and material. In another embodiment, The processor 132 may be communicatively coupled with the memory 134, wireless communication system 136, power supply 138, one or more wired connectors 140. The processor 132 may be coupled with the other components via a bus, circuit, wire, cable, network (e.g., wired or wireless), or other connection.

The processor 132 may be a general processor, digital signal processor, application specific integrated circuit, field programmable gate array, analog circuit, digital circuit, combinations thereof, or other now known or later developed processor. The processor 132 may be a single device or combinations of devices, such as associated with a network or distributed processing. Any of various processing strategies may be used, such as multi-processing, multi-tasking, parallel processing, remote processing, centralized processing or the like. The processor 132 may be responsive to or operable to execute instructions stored as part of software, hardware, integrated circuits, firmware, micro-code or the like. The functions, acts, methods or tasks illustrated in the figures or described herein may be performed by the processor 132 executing instructions stored in the memory 134. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The memory 134 may be any now known or later discovered data storage device. The memory 134 may include a non-volatile and/or volatile memory, such as a random access memory (RAM), a read-only memory (ROM), an erasable programmable read-only memory (EPROM), or flash memory. The memory 134 may include an optical, magnetic (hard-drive) or any other form of data storage device. The memory 134 may be removable. For example, the memory 330 may be disposed or located in remote device, such as the wired device 120 or removable memory (e.g., SD memory card).

The memory 134 may store information, such as adaptor identification information, wired device identification information, both adaptor identification and wired device identification information, adaptor-device identification information, or other information. The memory 134 may also store computer executable instructions. The processor 132 may execute computer executable instructions. The computer executable instructions may be included in computer code. The computer code may be stored in the memory 134. The computer code may be written in any computer language now known or later discovered, such as C++, C#, Java, Pascal, Visual Basic, Perl, HyperText Markup Language (HTML), JavaScript, assembly language, and any combination thereof. The computer code may be instructions encoded in one or more computer readable media for execution by the processor 132. The computer readable media may be tangible and non-transitory. Tangible and non-transitory computer readable media includes all forms of media which are not transient signals.

The wireless communication system 136 or wireless communication interface may be a radio communication system, radio, transceiver, network communication system, microwave communication system, any now known or later developed system for transmitting and/or receiving signals, or any combination thereof. For example, the wireless communication system 136 may be a combination of a radio communication system operative to communicate using radio waves and a network communication system that provides networking services, such as routing and/or switching. The wireless communication system 136 may include any combination of components used for communicating via a wireless network 102, such as a radio, antenna, wireless circuitry, wireless interfaces, or other wireless components. The wireless communication system 136 may communicate with an antenna of the network device 110 via the wireless network 102.

The power supply 138 may provide power to the components of the wireless adaptor 130. The power supply 138 may be an internal power supply independent from the wired device 120. One advantage of having an internal power supply, in combination with the other components of the wireless adaptor 130 is diagnosis of the wired device 120. For example, in the event that the wired device 120 loses power, the wireless adaptor 130 may continue to provide communication to the network device 110. Such communication may indicate that the wired device 120 lost power and that the network connectivity is still working properly. In an alternative embodiment, the power may be received from an external power supply. For example, the power for the components of the wireless adaptor may be received from the wired device 120 when connected.

The wired connection 104 may be a non-wireless connection, such as a USB connection, Firewire® connection, contact pin connection, or other wired system. The wired connection 104 may include wired connectors 122 and 140. In one embodiment, one or both of the wired connectors 122 and 140 may be USB connectors, Firewire connectors, SATA connectors, CAN connectors, I2C connectors, other non-wireless connectors, or combinations thereof. The wired device 120 may include the wired connector 122 and the wireless adaptor 130 may include the wired connector 140. The wired connectors 122 and 140 may include ports, interfaces, connectors, wires, circuits, physical contacts, other physical devices or connections, or a combination thereof. For example, as shown in FIG. 2, the wired connector 122a may be a USB plug-in (e.g., male) connector and the wired connector 140a may be a USB port (e.g., female). In an alternative embodiment, the wired device 130c may include the USB port and the wireless adaptor 130 may include the USB plug-in connector. In another embodiment, the wired connector 122b may include a combination of connectors and one or more wires. In alternative embodiments, the wired connection 104 may be replaced with a wireless connection, for example, using wireless USB or other short-range wireless connection.

The wired connectors 122 and 140 may take any form, size, or shape. For example, the wired connectors 122 and 140 may be pivotable or retractable into and out of a housing, such as the housing 142 or the housing for the wired device 120. Other configurations of the USB connectors 122 and 140 may be used. The USB connectors 104 and 140 provide a USB connection between the wireless adaptor 130 and the wired device 120.

The wired connector 140 may be communicatively coupled with the processor 132. Accordingly, the wired device 120 and the wireless adaptor 130 may communicate via the wired connection 104. Communication may be passed back and forth between wired device 120 and the wireless adaptor 130 via the wired connectors 122 and 140.

Figure 3:
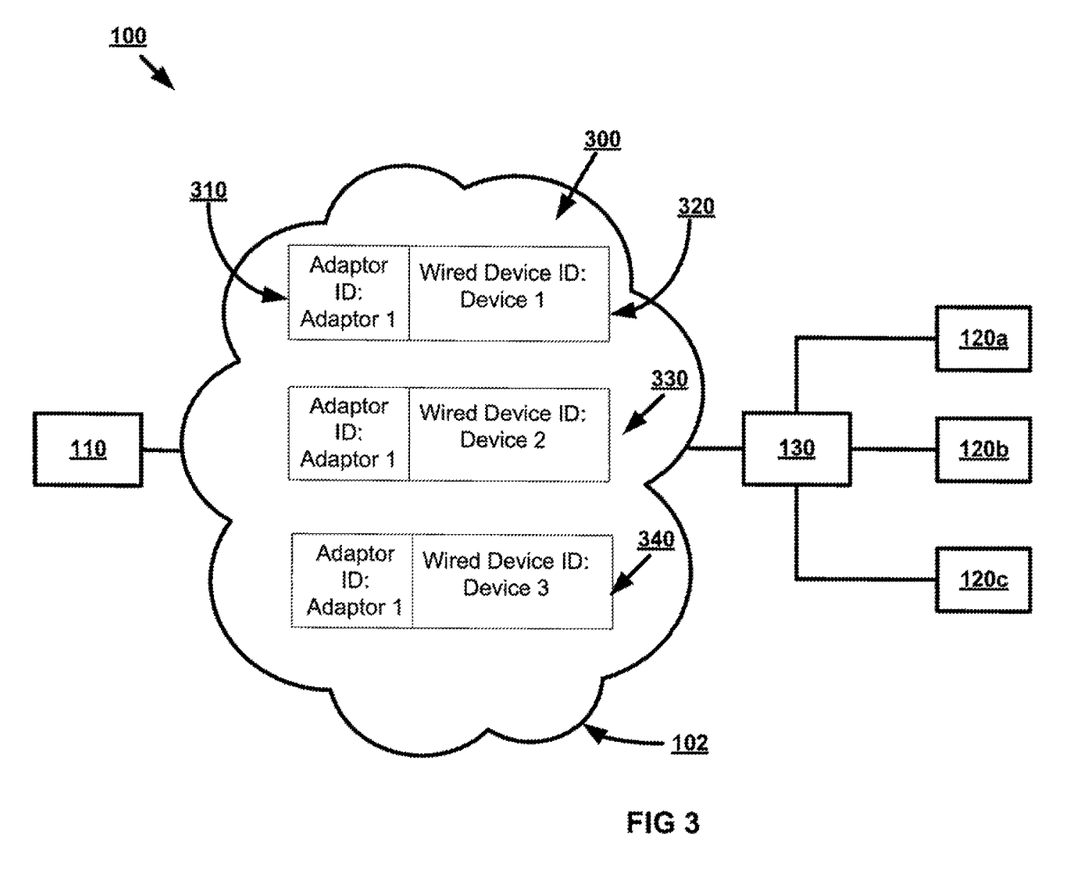
FIG. 3 illustrates one embodiment of communication transmitted between a wireless adaptor and a network device.

FIG. 3 illustrates one embodiment of the wireless network 100 operable to transmit communication 300 back and forth between the network device 110 and the wireless adaptor 120. The communication 300 may be signals, messages, packets, or other types of communication communicated across the wireless network 102. For example, a request message may be transmitted from the network device 110 to the wired device 120 via the adaptor 130. In response to a request message, the wired device 120 may transmit a response message via the adaptor 130.

The wireless adaptor 130 is operable to transmit and/or receive communication that is tailored, configured, or designed based on a particular or specific wired device 120. For example, in one embodiment, in addition to including an adaptor identification 310, which identifies the wireless adaptor 130, the wireless adaptor may add a wired device identification 320 to communication 300 transmitted from the wireless adaptor 130. In another embodiment, in response to receiving communication 300, the wireless adaptor 130 is operable to analyze and route the communication 300 based on the wired device identification 320. The communication 300 may be routed to the appropriate wired device 120. The communication 300 may include a payload or other data being transferred between the network device 110 and the wired device 120, for example, the communication 300 may include a request or response.

The adaptor identification 310 may identify the wireless adaptor 130 transmitting and/or receiving communication via wireless network 102. The adaptor identification 310 may be a unique identification, such as a network address, Internet Protocol (IP) address, Media Access Control (MAC) address, serial number, Bluetooth identifier, product identification, vendor identification, class identification, combination thereof, or other name or identification that uniquely identifies the adaptor 130. The adaptor identification 310 may be unique or specific to the wireless adaptor 130. In one embodiment, the adaptor identification 310 may be a default identification that identifies the wireless adaptor 130.

For example, in one embodiment, the adaptor identification 310 may be a Media Access Control (MAC) address for the wireless adaptor 130. The MAC address is a unique identifier assigned by the manufacturer for identification, and used in the Media Access Control protocol sub-layer. If assigned by the manufacturer, the MAC address may encode the manufacturer's registered identification number. It may also be known as an Ethernet Hardware Address (EHA), hardware address, adapter address, or physical address. The MAC address may be a permanent and globally unique identification. However, in other embodiment, the MAC address may be changed (e.g., MAC spoofing). Unlike IP address spoofing, where a sender spoofing their address in a request tricks the other party into sending the response elsewhere, in MAC address spoofing (which takes place only within a local area network), the response is received by the spoofing party. A host cannot determine from the MAC address of another host whether that host is on the same OSI Layer 2 network segment as the sending host, or on a network segment bridged to that network segment. In TCP/IP networks, the MAC address of a subnet interface can be queried with the IP address using the Address Resolution Protocol (ARP) for Internet Protocol Version 4 (IPv4) or the Neighbor Discovery Protocol (NDP) for IPv6. On broadcast networks, such as Ethernet, the MAC address uniquely identifies each node and allows frames to be marked for specific hosts. It thus forms the basis of most of the Link layer (OSI Layer 2) networking upon which upper layer protocols rely to produce complex, functioning networks.

In other embodiments, the adaptor identification 310 may be a pre-canned name, random name, a variation of the last name used, a programmed name, or any combination thereof.

The wired device identification 320 may identify the wired device 120 transmitting and/or receiving communication via the wireless adaptor 130. The wired device identification 320 may be a unique identification. In other words, the adaptor identification 310 may be unique or specific to the wired device 120. The wired device identification 320 may be determined based on wired device information, for example, retrieved from memory or the wired device 120.

For example, in one embodiment, the wired device identification 320 may be a USB identification. The USB identification may be a class identification. The adaptor 130 may request or query USB information from the wired device 130, which in this example is a USB device. The wired device 130 may return a product identification (PID), a vendor identification, VID), a class identification, or a combination thereof. The class identification may be obtained using the PID and VID. The class identification may be a wired device-specific identification and may be unique to the wired device 120 (e.g., even if the PID and VID are the same as other wired devices 120).

In other embodiments, the wired device identification 320 may include other unique identifiers, such as network addresses, Internet Protocol (IP) addresses, Media Access Control (MAC) addresses, serial numbers, Bluetooth identifiers, product identifications, vendor identifications, class identifications, combinations thereof, or other names or identifications that uniquely identifies the wired device 120. The adaptor identification 310 and wired device identification 320 may be used for publishing communication that is specific to the wired device 120. In other words, using the adaptor identification 310 and wired device identification 320, communication from the wired device 120 may be distinguished from communication from other wired devices. For example, the adaptor identification 310, such as an IP address, may be the same for multiple wired devices 120. However, the communication may be published to different Web pages. A single IP address may serve up multiple websites. For example, the wired device identifications 320 may act as host headers that distinguish between different pages when going to the same IP address.

The adaptor identification 310 and wired device identification 320 may be combined to obtain an adaptor-device identification. The wireless adaptor 130 may be configured or operable to distinguish communication for the wired device 120 from communication for other wired devices using the adaptor-device identification that uniquely identifies the wired device 120 and/or the wireless adaptor 130. As a result, the wireless adaptor 130 may dynamically adopt personalities of the wired devices coupled to the wireless adaptor. For example, in one embodiment, as shown in FIG. 3, the wireless adaptor 130 may receive communication 300, communication 330, and/or communication 340, for example, from the network device 110 via the wireless network 102. The communication 300, 330, 340 may be received simultaneously or at different times.

The wireless adaptor 130 may use the wired device identification 320 to distinguish between the communication 300, 330, and 340. For example, the wired device identification 320 may be used to determine that the communication 300 is to be routed to the wired device 120a, communication 330 is to be routed to the wired device 120b, and communication 340 is to be routed to the wired device 120c. In an alternative embodiment, the adaptor-device identifications may be used to distinguish between communications being transmitted from the wireless adaptor 130 to the network device 110 via the wireless network 102. The network device 110 may distinguish between the communication 300, 330, and 340 based on the adaptor-device identifications. The wireless adaptor 130 may distinguish between communications intended for a connected wired device 120, such as determining that the communication is intended for another wireless adaptor. The adaptor identification may be used. Alternatively, the wireless adaptor 130 uses the wired device identification without the adaptor identification. Any communications are labeled with the wired device 120 identification so that the wireless adaptor 130 acts as the wired device 120 on transmission or routes on reception.

Figure 4:
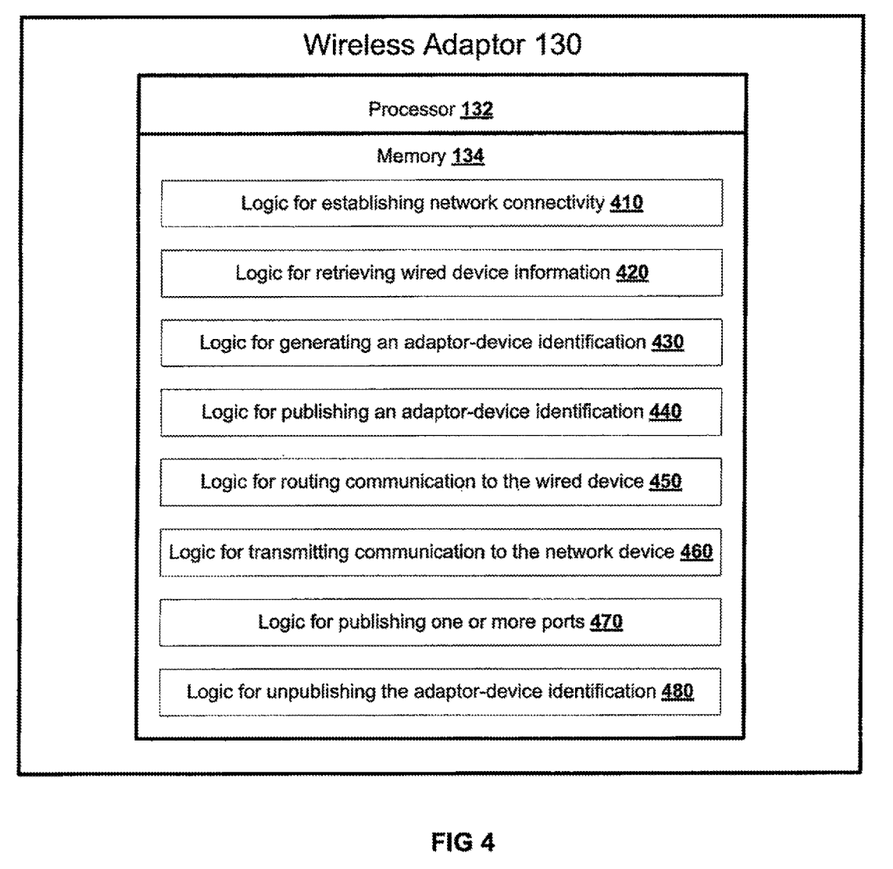
FIG. 4 illustrates one embodiment of a wireless USB adaptor.

FIG. 4 illustrates one embodiment of a wireless adaptor 130 including a memory 134. The memory 134 may store logic for establishing network connectivity 410, logic for retrieving wired device information 420, logic for generating an adaptor-device identification 430, logic for publishing an adaptor-device identification 440, logic for routing communication to the wired device 450, logic for transmitting communication to the network device 460, logic for publishing one or more ports 470, and logic for unpublishing the adaptor-device identification 480. All or a portion of the logic 410-480 may be stored, disposed, or located in one or more remote devices, such as the wired device 120 or a removable memory device (e.g., an SD memory card or other memory). As discussed above, the various logic components may be stored as instructions embodied on one or more computer readable media.

In one embodiment, the logic for establishing network connectivity 410 may be executed, for example, in response to the wireless adaptor 130 being powered up, a command, or one or more wired device 120 being connected to the wireless adaptor 130. The network connectivity may be established using a wireless identifier, such as a default name or the adaptor identification 310. The logic 410 may be executed to broadcast the wireless identifier, for example, using network discovery protocols (e.g., Bonjour, Netbios) that recognize the name and provide the appropriate mapping. Once network connectivity is established, the wireless adaptor 130 may be operable to communicate via the wireless network 102 using the adaptor identification 310. The logic 410 may also be executed to request a status, view configuration, or even set configuration information. Broadcasting the wireless identifier allows the wireless adaptor to communicate when not connected to a wired device, yet take on the personality of the wired device when connected. Once network connectivity is established, the network device 110 and/or adaptor 130 may function as a server, such as a web server that serves Web pages to a network. For example, the network device 110 may serve Web pages to an Internet Protocol (IP) address associated with the wireless adaptor 130.

The logic for retrieving wired device information 420 may be executed to retrieve wired device information. Wired device information may include a username, device name, serial number, information relating to the operation of the wired device 120, or any combination thereof. For example, when the wireless adapter 130 detects that the wired device 120 is plugged in, the logic 420 may be executed to retrieve the USB information and any identifying information about the wired device 130. Retrieving information may include requesting the information from the wired device 130, extracting the information from the memory 134, or otherwise obtaining the information from the network 100. The wired device information may be used to generate or used as the wired device identification 320. In an alternative embodiment, the wired device identification may be retrieved or requested, for example, from the memory 134 or wired device 120.

The logic for generating an adaptor-device identification 430 may be executed to generate an adaptor-device identification that is specific to the combination of the wireless adaptor 130 and the wired device 120 using the wireless adaptor 130. For example, in one embodiment, the adaptor-device identification may be a combination of the wireless adaptor identification 310 and the wired device identification 320. Generating an adaptor-device identification may include retrieving the adaptor-device identification from memory or requesting the adaptor-device identification from a remote location. In an alternative embodiment, the adaptor identification 310 and wired device identification 320 may be used, stored, or located independently of each other. A random or calculated identification may be used where a table associating different identifications with wired devices is maintained.

The logic for publishing an adaptor-device identification 440 may be executed to publish the adaptor-device identification via the wireless network 102. The adaptor-device identification may be published using the same discovery protocols as were used to establish the network connectivity. In other words, the logic 440 may be operable to provide the adaptor-device identification to the network device 110, such that the network device 110 is operable to communicate with the wired device 120 via the wireless adaptor 130. The adaptor-device identification may replace the originally published adaptor identification that was broadcast. In an alternative embodiment, the wired device identification 320 may be broadcast, such that the adaptor identification 310 and wired device identification 320 may be combined together by the network device. Accordingly, when transmitting communication to the wired device 120, the network device 110 may use the adaptor-device identification 440.

The logic for routing communication to the wired device 450 may be executed to accurately route communication to a wired device 120. The wireless adaptor 130 may receive communication from the network device 110 via the wireless network 102. The wireless adaptor 130 may execute the logic 450 to analyze the communication. Analyzing the communication may include extracting wired device identification from the adaptor-device identification. Based on the wired device identification, the logic 450 may be executed to route the communication to the appropriate wired device 120. Analyzing the communication may include extracting the identification information and looking up the associated wired device.

The logic for transmitting communication to the network device 460 may be executed to transmit communication to a network device 110 via the wireless network 102.

The logic 460 may be executed to receive communication from the wired device 120 and add an adaptor-device identification to the communication. Adding the adaptor-device identification may include bundling the adaptor-device identification and a payload or other data being transmitted between the network device 110 and wired device 120. In other embodiments, the device identification is provided with the communication by the wired device, and the wireless adaptor merely passes on the identification without change.

The logic for publishing one or more ports 470 may be executed to publish one or more ports. In one embodiment, the wireless adaptor may publish one or more channels via the wireless network 102. One or more serial communications channel to the wired device may be published. The one or more serial communications channels may pass messages to/from the USB port unidirectionally or bidirectionally. Communication may be full-duplex. In other words, communication may be sent bidirectionally and simultaneously. Such a communications channel typically is done via a known transmission control protocol ("TCP") port, but can also be exposed via the user datagram protocol ("UDP") or stream control transmission protocol ("SCTP"). A sequential interface on the network side carrying the traffic to/from the wired port of the wireless adaptor 130. In other words, communication may be sent to specific ports of the wireless adaptor 130 based on what wired device 120 is connected to the wired port and the adaptor-device identification in the communication. In another embodiment, a management interface (typically via HTTP) to provide status and configuration information about the device (if any) that is connected to the adapter. The management interface may retrieve information provided by the wired device 120.

Figure 5:
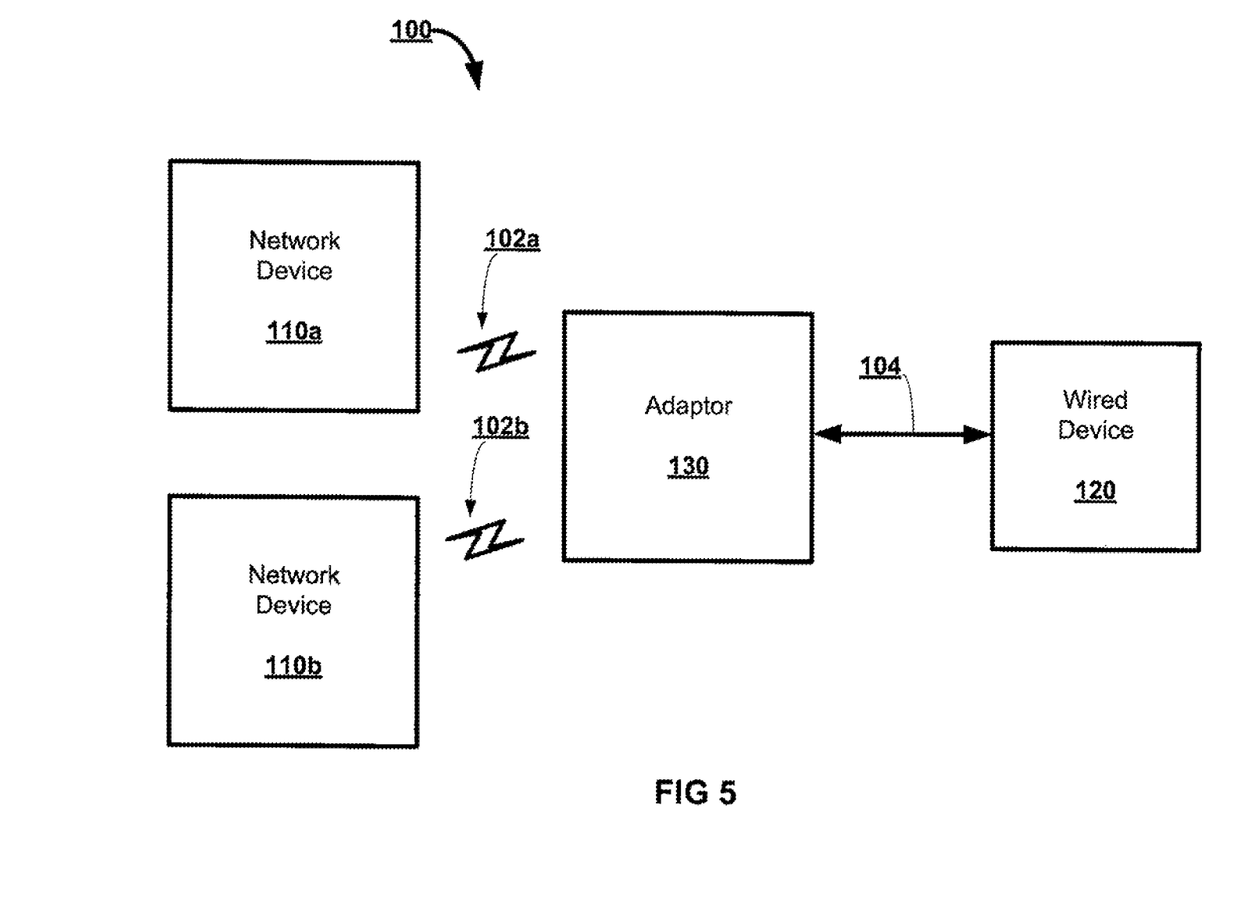
FIG. 5 illustrates another embodiment of the wireless network.

As illustrated in FIG. 5, the adapter 130 may interleave responses and/or requests transmitted back and forth between a network device 110 and a wired device. Interleaving may include organizing, associating, tracking, or otherwise accurately routing. Two network devices 110a and 110b may access or attempt to access the wired device 120 at the same or different times. In one example, the wired device 120 is a digital camera and the network device 110a starts to download pictures. In order to download the pictures, the network device 110a sends a request to read sector <x> via network connection 102a to adapter 130. Adaptor 130 receives and notes the request from the network device 110a, marks the request as pending a response for network device 110a, and forwards the read sector <x> request over wired connection 104 to the wired device 120. At the same or different time, network device 110b connects to the adaptor 130 and makes a request to read sector <y> via wireless network 102b. Adaptor 130 receives and notes the request from network device 110b, marks the request pending a response for network device 110b, and forwards the read sector <y> request over wired connection 104 to wired device 120. When adaptor 130 detects the response for the read sector <x> request, it compares it to the list of outstanding requests, determines that the response is associated with network device 110a, removes it from the list of pending requests, and forwards the response to network device 110a. Similarly, when the response for read sector <y> returns, it performs the same operation forwarding the response to network device 110b. In one embodiment, because the requests and responses over USB Cable System 104b are essentially sequential, even if the requests were effectively identical, the association of which Network Device to respond to can be accomplished in a FIFO manner. One advantage that this scheme also provides is that if Adaptor 130 recognizes the request and already has the information because it had recorded a previous response from USB Device 120b for an identical request, adaptor can respond immediately to the Network Adaptor without having to query the USB device.

Referring back to FIG. 4, the logic for unpublishing the adaptor-device identification 480 may be executed to unpublish the adaptor-device information. If the wired device 120 is disconnected, the wireless USB adapter 130 may default or revert back to the power up configuration, for example, communicating without the wired device identification. The logic 480 may be executed to publish the default name using the network discovery. In other words, the adaptor-device identification may be unpublished.

Figure 6:
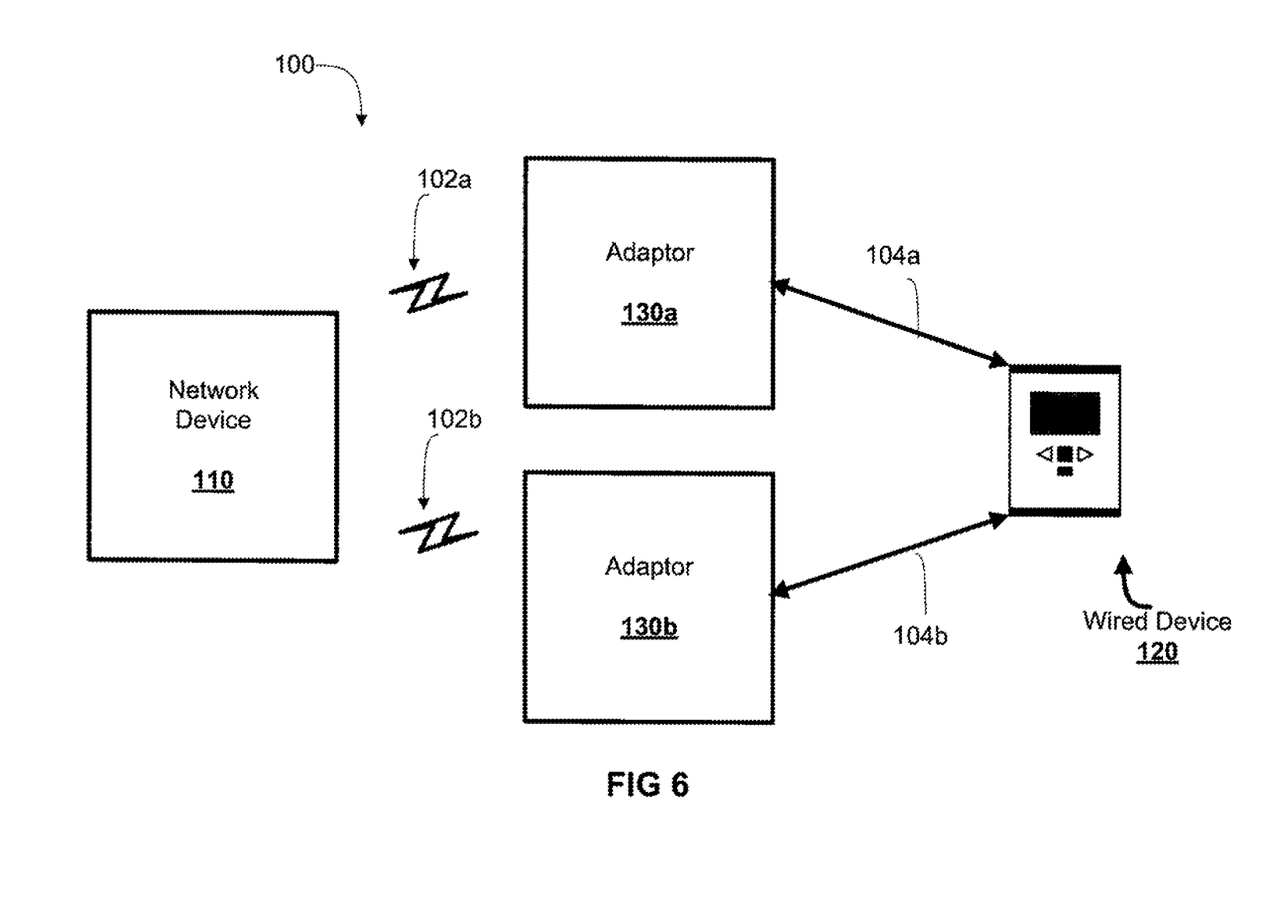
FIG. 6 illustrates yet another embodiment of the wireless network.

FIG. 6 illustrates that the wireless USB adapter 130 may act as a proxy for any wired device 120. As a result of unpublishing the adaptor-device identification, a wired device 120 may be moved from a first adaptor 130 to a second adaptor 130 and continue to communicate via the wireless network 102. As illustrated in FIG. 6, that wired device 120 is initially connected to adaptor 130a via wired connection 104a. When it is first connected, adaptor 130 publishes the name of wireless device 120a to wireless network 102a providing the address of adaptor 130a as the destination. When network device looks up device 120c using a discovery protocol, such as Bonjour, Rendezvous or NetBios, the adaptor 130 returns the IP address of adaptor 130a as the destination. Network Device 110 can then communicate to network device 120a through wireless network 102a. The wired device 120 may be disconnected from adaptor 130a and plugged into adaptor 130b via wired connection 104b. When the wired connection 104a is removed or an unpublish command is provided to the adaptor 130a, adaptor 130a unpublishes the name of wired device 120. When adaptor 130b detects that wired device 120 is connected via wired connection 104b to adaptor 130b, the adaptor 130b publishes the name of wired device 120 providing the address of adaptor 130b as the destination. When network device 110 looks up wired device 120 by name as it had done previously, the address of adaptor 130b as the destination is returned. Accordingly, network device 110 can continue to communicate to wired device 120 via wireless network 102b. The wireless network 102a and 102b may be the same or different wireless networks.

Figure 7:
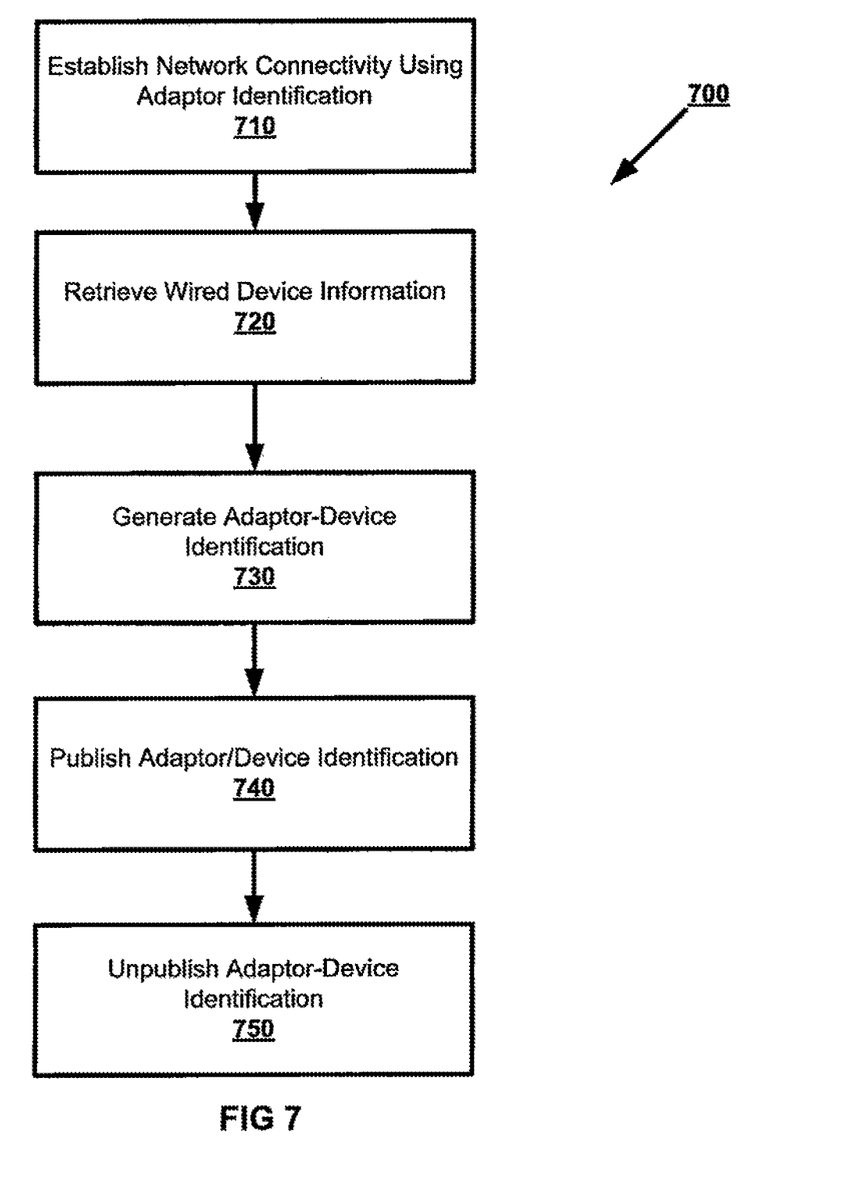
FIG. 7 illustrates one embodiment of a method for using a wireless USB adaptor.

FIG. 7 illustrates one embodiment of a method 700. The acts may be performed in the order shown or a different order. For example, act 720 may be performed before act 710. The acts may be performed automatically, manually, or the combination thereof. The acts may be performed by one, some, or all of the components in the system 10 of FIG. 1 or a different system.

The method 700 may include establishing network connectivity using adaptor identification 710; retrieving wired device information 720; generating adaptor-device identification 730; publishing adaptor-device identification 740; communicating using the adaptor-device identification 750; and unpublishing adaptor-device identification 750.

In act 710, a wireless adaptor may establish network connectivity. Network connectivity may be established in response to the wireless adaptor being powered up, connection of a wired device, or other trigger. Establishing network connectivity may include setting up and maintaining a communication session. The network connectivity may be established using a default name, such as the adaptor identification 310. The default name may be broadcast to one or more network devices via a wireless network, such that network discovery protocols (e.g., Bonjour, Netbios) recognize the default name. Accordingly, the default name may be used to establish a communication session between the wireless adaptor and one or more network devices. Establishing network connectivity may include requesting a status, view configuration, or even set configuration information.

Figure 8:
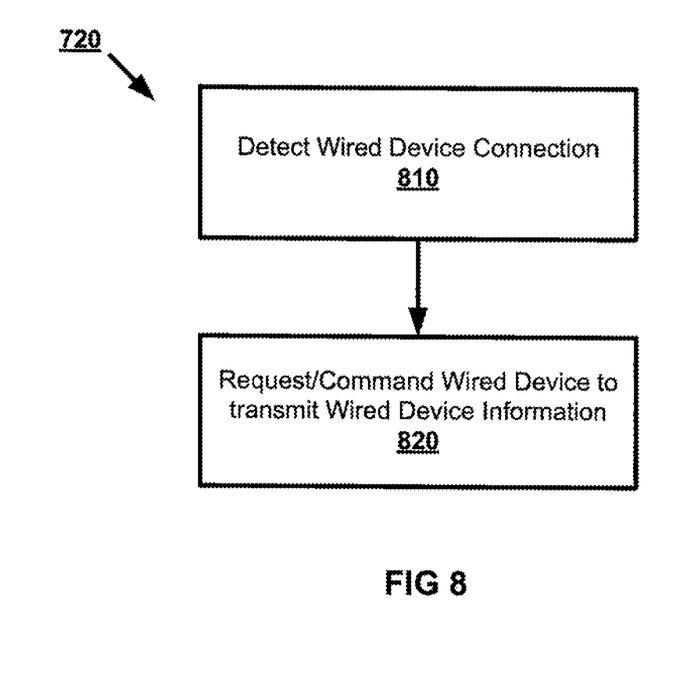
FIG. 8 illustrates one embodiment of a method for retrieving wired device information.

In act 720, the wireless adaptor may retrieve wired device 120 information. Wired device information may include a username, device name, serial number, information relating to the operation of the wired device 120, or any combination thereof. FIG. 6 illustrates one embodiment of act 720. As shown in FIG. 8, retrieving wired device information may include detecting a wired device connection, as illustrated in act 810, and requesting wired device information in response to detecting the wired device connection, as illustrated in act 820. Requesting wired device information may include Retrieving information may include requesting the information from the wired device, extracting the information from the memory, or otherwise obtaining the information from the network 100. For example, when the wireless adapter detects that the wired device is plugged in, the wired device information and any identifying information about the wired device may be retrieved. The wired device information may be used to generate wired device identification. In an alternative embodiment, the wired device identification may be retrieved or requested, for example, from the memory or Wired device.

Figure 9:
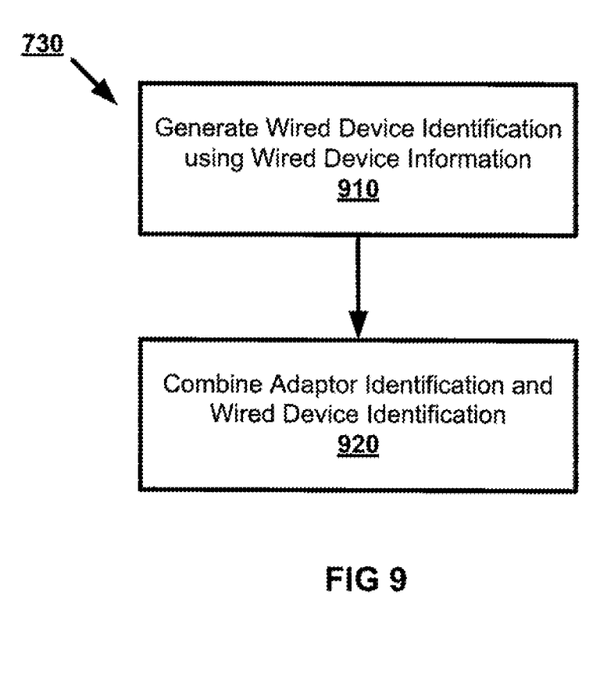
FIG. 9 illustrates one embodiment of a method for generating an adaptor-device identification.

Referring back to FIG. 7, the wireless adaptor may generate an adaptor-device identification, as shown in act 730. In one embodiment, as shown in FIG. 9, generating the adaptor-device identification may include generating a wired device identification using the retrieved wired device information, as shown in act 910, and combining a wireless adaptor identification and the wired device identification, as shown in act 920. In an alternative embodiment, generating an adaptor-device identification may include retrieving the adaptor-device identification from memory or requesting the adaptor-device identification from a remote location. In another embodiment, the wired device identification is used. The adaptor establishes communications again or differently based on the new identification information.

As shown in FIG. 7, the wireless adaptor publishes the adaptor-device identification, as illustrated in act 740. The adaptor-device identification may be published using the same discovery protocols as were used to establish the network connectivity. In other words, the adaptor-device identification may be provided to the network device, such that the network device is operable to communicate with the wired device via the wireless adaptor. Accordingly, when transmitting communication to the wired device, the network device may use the adaptor-device identification.

In act 750, the wireless adaptor communicates using the adaptor device identification. Communicating using the adaptor-device identification may include transmitting and/or receiving communication with the adaptor-device identification. For example, in one embodiment, the wireless adaptor receiving communication with the adaptor-device identification and accurately routes the communication to a wired device. The wireless adaptor may receive communication from the network device via the wireless network. The wireless adaptor may analyze the received communication. Analyzing the communication may include extracting a wired device identification from the adaptor-device identification and determining or identifying the wired device that the communication was transmitted to. Based on the wired device identification, the wireless adaptor may route the communication to the appropriate wired device. In another embodiment, the wireless adaptor may transmit communication to a network device via the wireless network. Prior to transmission, the wireless adaptor may add the adaptor-device identification. Adding the adaptor-device identification may include bundling the adaptor-device identification and the communication.

In act 760, the wireless adaptor may unpublish the adaptor-device identification. Unpublishing the adaptor-device identification may include republishing the default name. In other words, when the wired device is disconnected, the wireless adapter may default or revert back to the power up configuration, for example, communicating without the wired device identification. The default name may be published using the network discovery.

Figure 10:
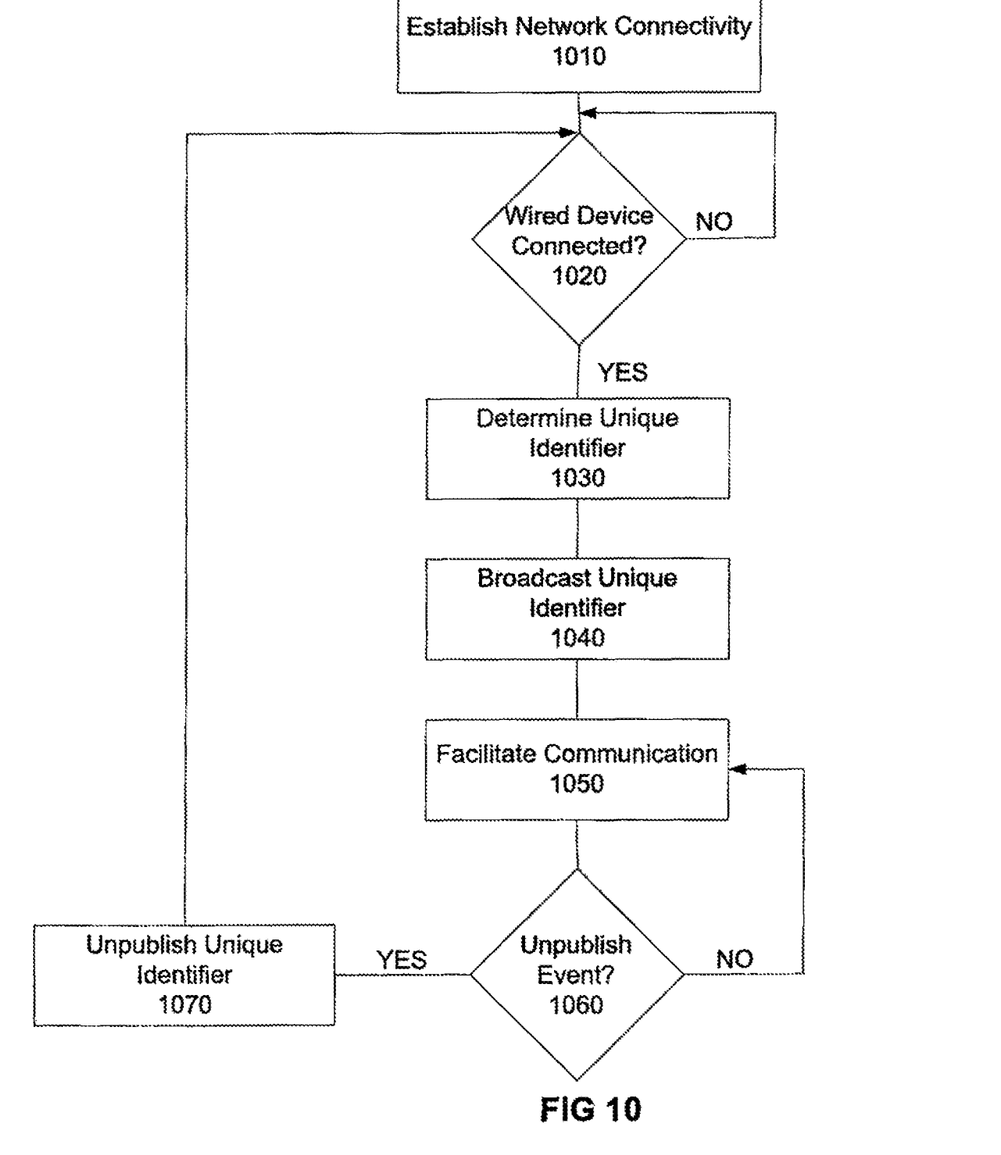
FIG. 10 illustrates one embodiment of a method for facilitating communication between a wired device and a network device via a wireless network.

FIG. 10 illustrates one embodiment of a method for communication. In act 1010, the adaptor establishes network connectivity with a wireless network. In act 1020, the adaptor determines whether a wired device has been coupled with the adaptor. Once connected (YES), the adaptor may determine a wired device unique identifier for the wired device, as illustrated in act 1030. The adaptor may broadcast, for example, using a discovery protocol, the wired device unique identifier to the wireless network, as shown in act 1040. The adaptor may facilitate communication back and forth between a network device communicating via the wireless network and the wired device coupled with the adaptor, as shown in act 1050. The adaptor may determine or detect an unpublish event, such as disconnection of the wired device or an unpublish command, as illustrated in act 1060. Until the unpublish even is detected, the adaptor may continue to facilitate communication (NO). However, once an unpublish event has been detected (YES), the adaptor may unpublish the wired device unique identifier, as shown in act 1070. Once unpublished, the wired device may be associated with another adaptor without interference (e.g., miscommunication) from the original adaptor. The adaptor may then continue to wait for a wired device to be connected, as shown in act 1100.

Figure 11:
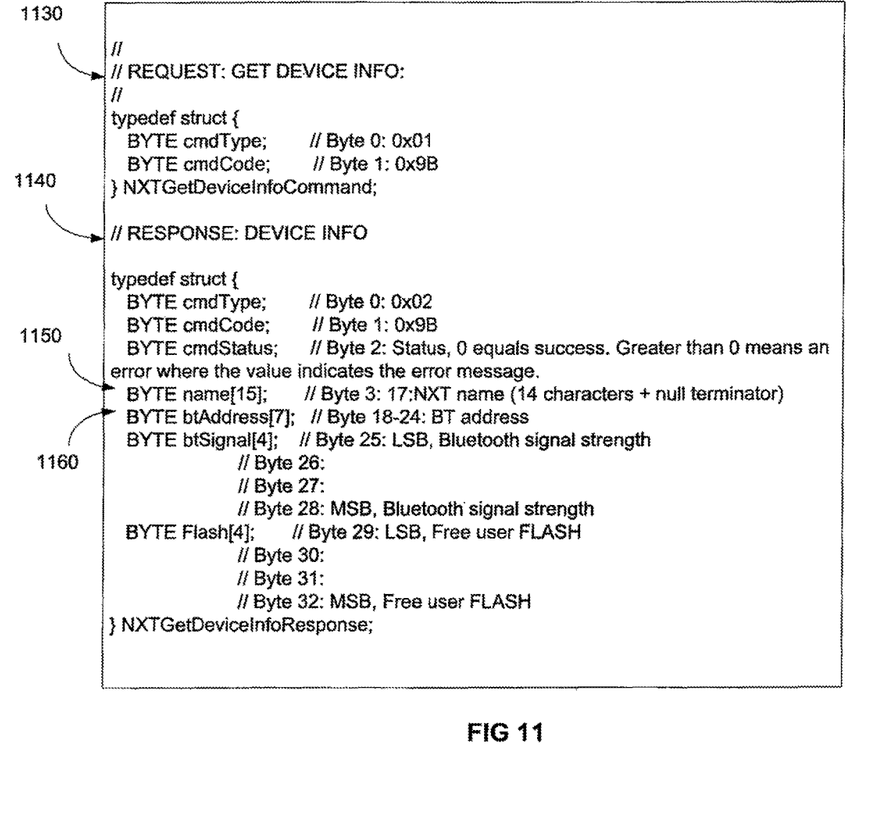
FIG. 11 illustrates one embodiment of a request message and a response message used to obtain wired device information.

FIG. 11 illustrates one embodiment of using a wireless adaptor, as discussed in one or more of the embodiments disclosed above. The wireless adaptor is used to bridge a communication gap between the network device 110, which is configured to communicate via the wireless network 102, and the wired device 120, which is not configured to communicate via the wireless network 102. In this illustration, the wired device 120 may be first robot, such as a Lego Mindstorms NXT robot, that may be used in a robotics competition. The wireless adapter 130 has a default MAC address that ends, for example, in 00ABCD. The name of the first robot is 2901. When the wireless adapter is powered up, the wireless adaptor publishes the default MAC address during establishment of network connectivity. The network device 110 discovers the wireless adaptor and publishes the communication on a network, for example, using the MAC address. The communication may be published to a Web page on a network. For example, pinging "NXT00ABCD" or opening a network web page at http://NXT00ABCD may be used to view the status of the wireless adaptor. When the first robot is plugged-in to the wireless adaptor, for example, using a USB connection, the wireless adaptor may retrieve a first robot identification, for example, from memory or from the first robot. In one example, as shown in FIG. 11, the wireless adaptor may send a request message 1130 to the first robot. In response to the request message 1130, the first robot may provide a response message 1140. The response message 1140 may include device information, such as a unique identifier for the enumerated first robot. The unique identifier, such as the robot name 1150 or Bluetooth address 1160, may be used as the first robot identification. The wireless adaptor may begin communicating using the MAC address and the first robot identification. Accordingly, the network device 110 may begin publishing information on the network using "NXT2901" or "HTTP://NXT2901." Furthermore, the HTTP://NXT2901 web page would list out status information obtained by talking to a port on the wireless adaptor connected to the first robot and querying the first robot. The network device 110 reads that information from the first robot and then makes it available via Windows NetBios (port 137) as well as responds to discovery requests on port 30303 (Microchip discovery standard). The effect is that you can go to windows and refer to http://NXT2901 and get a web browser interface to the wireless module serving team 2901's robot—regardless of which wireless module is used.

Various embodiments described herein can be used alone or in combination with one another. The foregoing detailed description has described only a few of the many possible implementations. This detailed description is intended by way of illustration, and not by way of limitation. All equivalents or reasonable substitutions are intended to be included in this description.

What is claimed is:

1. A method comprising:
obtaining an adaptor-device identification that identifies both a wireless adaptor and a wired device coupled with the wireless adaptor; and
communicating with a network device via a wireless network using the adaptor-device identification, the adaptor-device identification uniquely identifying the wired device, wherein the adaptor-device identification distinguishes the wired device from other wired devices connected to the wireless adaptor.

2. The method of claim 1, wherein the wireless adaptor identification is an address that is unique to the wireless adaptor and used to communicate with the wireless adaptor.

3. The method of claim 1, further comprising:
generating a wired device identification;
bundling the wired device identification with a wireless adaptor identification to obtain the adaptor-device identification; and
receiving communication from a wired device, wherein the communication includes the adaptor-device identification.

4. The method of claim 1, further comprising:
routing the communication to the wired device in response to analyzing the adaptor-device identification.

5. The method of claim 1, wherein the wireless adaptor identification is a media access control (MAC) address and the wired device is coupled with the wireless adaptor via universal serial bus (USB).

6. A non-transitory computer readable storage medium encoded with instructions capable of being executed by a computer to:
communicate, using a wired device, with a network device via a wireless network using the adaptor-device identification, the wired device being distinguishable from other wired devices using an adaptor-device identification.

7. The logic of claim 6, wherein the logic is executable to:
generate a wired device identification; and
bundle the wired device identification with a wireless adaptor identification.

8. The logic of claim 7, wherein the wireless adaptor identification is an address that is unique to the wireless adaptor and used to communicate with the wireless adaptor.

9. The logic of claim 6, wherein the logic is executable to:
receive communication from a wired device; and
transmit the communication via the wireless network, the communication including the adaptor-device identification.

10. The logic of claim 6, wherein the logic is executable to:
receive communication from the network device via the wireless network; and
in response to analyzing the adaptor-device identification, routing the communication to the wired device.

11. The logic of claim 10, wherein the logic is executable to determine the wired device that the communication is being transmitted to based on the adaptor-device identification.

12. The logic of claim 6, wherein the logic is executable to establish a network connection with the network device via the wireless network.

13. An apparatus comprising:
a plurality of wired connectors configured to communicate with a plurality of wired devices and receive a plurality of wired device identification values from the plurality of wired devices, wherein the apparatus is configured to communicate differently for each of the wired devices according to the plurality of wired device identification values.

14. The apparatus of claim 13, further comprising:
a processor configured to distinguish communications for each of the plurality of wired devices according to the plurality of wired device identification values in order to facilitate communication between the network device at the plurality of wired devices.

15. The apparatus of claim 13, further comprising:
an internal power source independent from the plurality of wired device; and
a power supply interface configured to receive power from at least one of the plurality of wired devices.

16. The apparatus of claim 15, wherein the apparatus is configured to receive power from the power supply interface until the at least one of the plurality of wired devices loses power.

17. The apparatus of claim 15, wherein the apparatus is configured to receive power via the internal power source when none of the plurality of wire devices are connected to the plurality of wired connectors.

18. The apparatus of claim 13, wherein the adaptor identification information includes a media access control (MAC) address of the apparatus.

19. The apparatus of claim 13, wherein the apparatus acts as a proxy for the plurality of wired devices with respect to the network device.

* * * * *